(12) United States Patent
Hall

(10) Patent No.: US 8,668,120 B2
(45) Date of Patent: Mar. 11, 2014

(54) DISPENSING CONTAINER

(75) Inventor: Nevil Peter Hall, Yorkshire (GB)

(73) Assignee: Millers Oils Limited (GB)

( * ) Notice: Subject to any disclaimer, the term of this patent is extended or adjusted under 35 U.S.C. 154(b) by 24 days.

(21) Appl. No.: 13/203,856

(22) PCT Filed: Mar. 2, 2010

(86) PCT No.: PCT/GB2010/050363
§ 371 (c)(1),
(2), (4) Date: Oct. 10, 2011

(87) PCT Pub. No.: WO2010/100484
PCT Pub. Date: Sep. 10, 2010

(65) Prior Publication Data
US 2012/0132677 A1    May 31, 2012

(30) Foreign Application Priority Data

Mar. 2, 2009 (GB) .................................. 0903473.7
Mar. 2, 2010 (GB) ................. PCT/GB2010/050363

(51) Int. Cl.
*G01F 11/26* (2006.01)
(52) U.S. Cl.
USPC ............................ 222/454; 222/523; 222/207
(58) Field of Classification Search
USPC ......... 222/454, 522–525, 456, 205, 207, 158, 222/499, 509
See application file for complete search history.

(56) References Cited

U.S. PATENT DOCUMENTS

| | | | | |
|---|---|---|---|---|
| 690,754 | A | * | 1/1902 | McKechney .................. 239/546 |
| 1,473,925 | A | | 11/1923 | Dryer |
| 2,300,414 | A | * | 11/1942 | Grant ............................ 222/523 |

(Continued)

FOREIGN PATENT DOCUMENTS

| | | |
|---|---|---|
| DE | 10327974 | 1/2005 |
| GB | 2285800 | 7/1995 |

(Continued)

OTHER PUBLICATIONS

Great Britain Office Action, corresponding to Great Britain Patent Application No. GB0903473.7, dated Dec. 24, 2012.

*Primary Examiner* — Kevin P Shaver
*Assistant Examiner* — Robert Nichols, II
(74) *Attorney, Agent, or Firm* — Marianne Fuierer; Moore & Van Allen, PLLC

(57) ABSTRACT

The present invention relates to a dispensing container for liquids comprising a reservoir (1) which is connected to a dispensing nozzle (6), the nozzle having a mouth (4) through which liquid is dispensed, wherein the nozzle is adapted such that the size of the mouth is adjustable. In the most preferred embodiment, the container comprises a dispenser for fuel additives which comprises a novel design of dispensing nozzle, comprising a tube (5) adapted to fit the fuel tank of a petrol engine and a moveable sleeve (8) of greater diameter than the tube and adapted to fit the fuel tank of a diesel engine, this sleeve being positioned around the tube such that it can be moved to a position at the dispensing end of the tube which prevents the nozzle from being inserted into the fuel tank of a petrol engine. The invention provides a single dispensing container which is adapted for use in conjunction with the fuel tanks of both petrol and diesel engines, and may be employed as a container for a fuel additive for either petrol or diesel fuel.

20 Claims, 4 Drawing Sheets

(56) References Cited

U.S. PATENT DOCUMENTS

| | | | |
|---|---|---|---|
| 3,141,574 A * | 7/1964 | Donoghue | 222/157 |
| 4,111,244 A * | 9/1978 | Vest | 141/348 |
| 4,856,664 A | 8/1989 | Gillispie et al. | |
| 5,065,913 A * | 11/1991 | Glasener | 222/528 |
| 5,400,928 A | 3/1995 | Resnick | |
| 5,762,117 A * | 6/1998 | Law | 141/198 |
| 5,988,413 A * | 11/1999 | Nagel | 215/216 |
| 5,996,858 A * | 12/1999 | Tapp et al. | 222/538 |
| 6,834,782 B2 * | 12/2004 | Ritter | 222/521 |
| 7,014,074 B1 | 3/2006 | Rinaldi | |
| 2007/0175929 A1 * | 8/2007 | Schram | 222/527 |

FOREIGN PATENT DOCUMENTS

| | | |
|---|---|---|
| GB | 2351959 | 1/2001 |
| WO | WO87/01677 | 3/1987 |
| WO | WO2004020298 | 3/2004 |
| WO | 2004/045963 | 6/2004 |

* cited by examiner

DISPENSING CONTAINER

CROSS-REFERENCE TO RELATED APPLICATIONS

This application is filed under the provisions of 35 U.S.C. §371 and claims the priority of International Patent Application No. PCT/GB2010/050363 filed on Mar. 2, 2010, which in turn claims priority to GB 0903473.7 filed Mar. 2, 2009.

FIELD OF THE INVENTION

This invention relates to dispensing containers, most specifically dispensing containers which are used for the addition of fuel additives to the fuel tanks of vehicles immediately prior to or after dispensing fuel into the tanks. Most particularly, the invention provides a container which may be used for the addition of fuel additives to petrol and, more especially, to diesel fuel.

BACKGROUND TO THE INVENTION

With the ever greater reliance on fuel products for powering various motors, including those used in all forms of transport, attention has, for many years, been focused on attempts to increase fuel efficiency, and this has particularly been true in the case of road vehicles, including both domestic vehicles such as cars, and commercial vehicles, for example vans and lorries. Typically, such fuel additives are designed to provide improvements in terms of various aspects of vehicle performance including, for example, increased fuel efficiency—and thereby lower overall fuel costs—lower emissions, cleaner fuel injectors and increased protection against bacterial contamination of fuel and fuel systems.

In the great majority of cases, these vehicles are powered by means of either unleaded petrol or diesel fuel. However, as is well known, these two fuels are completely incompatible, and the use of one of these fuels is not possible in an engine designed to be powered by the other fuel. In fact, in such cases, addition of the incorrect fuel to a vehicle would result in serious damage to the engine. Consequently, as an additional precaution designed to prevent addition of the wrong fuel to an engine, the entry orifices of fuel tanks, which are generally circular in cross-section, are designed to have different diameters dependent on whether the associated engine is a petrol or diesel engine, and the fuel dispenser nozzles intended to dispense the different fuels are also usually circular in cross-section, and have correspondingly different diameters, so that a nozzle intended to dispense petrol is designed to fit snugly into the entry orifice of the fuel tank of a petrol engine, whilst a nozzle for diesel correspondingly provides a neat fit into the entry orifice of a diesel tank. Thus, diesel dispenser nozzles and the entry orifices of fuel tanks of diesel engines are of significantly greater diameter than petrol dispenser nozzles and the entry orifices of fuel tanks of petrol engines.

Naturally, in view of the major differences between petrol and diesel fuel, different additives have been developed for use in conjunction with the different fuels, so that the range of additives which is available for addition to petrol is fundamentally quite different to that which is supplied for use in diesel fuel. Clearly, therefore, it is important that the two different ranges of products should not be confused, since the use of petrol additives in diesel fuel, or vice versa, would be highly undesirable, with regard to both performance and potential damage to the engine.

In certain instances, performance additives are added to fuel before it is dispensed into a vehicle. However, more commonly, the additive is added to the fuel tank of a vehicle immediately prior to or immediately after dispensing fuel into the vehicle. In other words, the additive is added separately to the fuel tank of a vehicle, typically prior to addition of the fuel to the tank. Naturally, when the vehicle concerned is a road vehicle, such as a car, van or lorry, addition of the additive will usually be carried out by the vehicle owner, who will probably also be the driver. For practical purposes, the additives are usually supplied in conveniently sized containers, such as bottles, so that the vehicle owner/driver can easily make the addition to the fuel tank.

Naturally, the fuel additive containers are adapted such that addition to a fuel tank is a straightforward operation that can be speedily completed. For this reason, the containers are usually provided with a dispensing means which is generally in the form of a dispensing nozzle, which can be inserted into the mouth of the relevant fuel tank.

Clearly, however, for the reasons discussed above, the dispensing nozzle of a container must be suitable for insertion into the entry orifice of the particular fuel tank for which the additive is intended. Thus, for a petrol additive, the nozzle is required to fit the entry of the fuel tank of a petrol engine whilst, in the case of a diesel additive, the nozzle is required to be suitable for the larger entry orifice of the fuel tank of a diesel engine.

Previously, it has generally been the case that containers provided with nozzles designed to fit the narrower entry orifices of fuel tanks of petrol engines have also been used in conjunction with the larger entry orifices of the fuel tanks of diesel engines, since these nozzles were able to fit each of these tanks. However, in recent years, primarily motivated by a desire to prevent the accidental filling of diesel tanks with petrol using the narrower fuel dispenser nozzles of petrol pumps, vehicle manufacturers have provided the entry orifices of diesel tanks with barrier mechanisms adapted to close off these orifices at all times other than when fuel or additives are being introduced into the tank.

When filling the tank, these barrier mechanisms may only be activated by nozzles of essentially the same external diameter as the entry orifice, so that the use of nozzles designed for the introduction of petrol and petrol additives is prevented, since these are of smaller diameter, and the risk of potential damage to the engine as a consequence of the use of incorrect fuel or fuel additives is thereby substantially eliminated.

Clearly, in such cases, where these barrier mechanisms are in place, it would not be possible to use fuel additive dispensers which are designed for use in conjunction with petrol engines in order to add diesel additive to the fuel tank of a diesel engine, and a dispenser with a larger diameter nozzle would be required. Thus, there is a need for containers to be provided which incorporate dispensing nozzles which are adapted so as to neatly fit the entry orifices of the respective fuel tanks. It is this requirement which the present invention seeks to address.

The simplest approach to the alleviation of this situation would necessitate the production of different containers for the different additives for petrol and diesel, with containers intended for use with diesel additives requiring to be provided with dispensing means having a greater diameter than those designed for use with petrol additives. This, however, would require the production of containers of different dimensions for the two different additives, which would clearly have disadvantages in terms of tooling requirements and efficiency of production. The present inventors have also sought to address this issue, and have achieved this by the provision of a single container which may be used for dispensing either petrol or diesel additives. This has simplified the position in respect of tooling requirements and processes for the production of these containers, since the manufacturers have been able to concentrate on the production of a single design of container with dual uses.

SUMMARY OF THE INVENTION

The present inventors have developed a dispenser for fuel additives which comprises a novel design of dispensing nozzle, whereby a standard dispenser, in which a fixed tube is attached to the main body of a container, the tube having a diameter sufficient to allow a fuel additive to be dispensed into the entry orifice of the fuel tank of a petrol engine, is additionally provided with a moveable sleeve having a diameter greater than that of the tube and of sufficient dimensions to allow a fuel additive to be dispensed into the entry orifice of the fuel tank of a diesel engine, this sleeve being positioned around the tube such that it can be moved to a position at the dispensing end of the tube which prevents the nozzle being inserted into entry orifice of the fuel tank of a petrol engine and facilitates entry into the fuel tank of a diesel engine wherein the entry orifice comprises a barrier mechanism adapted to close off the orifice and prevent passage of nozzles of different diameters to the orifice.

Thus, according to the present invention, there is provided a dispensing container for liquids comprising a reservoir which is connected to a dispensing nozzle, said nozzle having a mouth through which liquid is dispensed, wherein the nozzle is adapted such that the size of said mouth is adjustable.

Generally, said mouth comprises an orifice of circular cross-section, and the nozzle is adjustable to provide orifices of different diameters. Preferably, adjustment of the diameter of the nozzle is achieved by providing a nozzle in the form of an inner tube, fixedly connected to the reservoir, and an outer sleeve of greater internal diameter than the tube, wherein said outer sleeve is moveably attached to the exterior of the tube, such that it can be moved from a first position, distant from the mouth of the tube to a second position, proximate said mouth, such that the effective diameter of the orifice is equal to the internal diameter of said sleeve. Preferably, said sleeve may be slidably and/or rotatably moved from said first position to said second position.

The dispensing container of the present invention is particularly suitable for the dispensing of fuel additives and, consequently, the liquid preferably comprises a fuel additive. More preferably, the liquid is a fuel additive for petrol but, particularly preferably, the liquid is a fuel additive for diesel. In said embodiments, the invention thereby provides a means by which a dispensing container suitable for the dispensing of petrol additives to petrol may simply be adapted so as to be suitable for the dispensing of diesel additives to diesel fuel.

Preferably, the distant end of the inner tube incorporates closure means, typically a screw thread on its external surface which can engage with a suitable cap.

Preferably, the dispensing container of the present invention comprises a container which is formed from a plastics material. Any plastics material having the required degree of resilience, dimensional stability and resistance to attack by the liquids which are to be placed in the container is suitable for this purpose. Most preferably, said plastics material comprises commercially available high density polyethylene (HDPE). Typically, the containers are manufactured by blow-moulding from said plastics material.

In a particularly preferred embodiment of the invention, the dispensing container additionally comprises a measuring and dispensing chamber. Thus, in said embodiment, the reservoir, which is adapted to hold a bulk quantity of liquid, is in communication with said measuring and dispensing chamber, to which liquid can be transferred and from which the liquid can then be poured. The reservoir and the measuring chamber are preferably connected by means of a fluid transfer duct such that, by squeezing the container, liquid is forced to be transferred from the reservoir to the chamber and can then be dispensed by pouring. Preferably, a graduated scale is located on the exterior of said measuring and dispensing chamber, indicating the optimum dose levels of fuel additives which are to be employed.

The nozzle of the dispensing container is used for filling and dispensing, and the reservoir has a throat in alignment with the mouth at the end of the nozzle. A plug is inserted into the throat in order to control fluid communication via the throat, between the reservoir and the measuring chamber.

In one alternative embodiment, the plug may be in the form of a valve which, according to its angular position, prevents or permits passage of fluid, which may be liquid or air, through the throat between the reservoir and the measuring chamber and between said chamber and the dispensing nozzle. However, in the most preferred embodiment, the plug is a simple stopper which, after the reservoir has been filled, is inserted into the throat in order to close it; thereafter, by appropriate squeezing of the container, liquid may be transferred through the transfer duct to the measuring chamber, adjusted to a specific level, and then dispensed from the mouth of the container.

In preferred embodiments of the invention, the lower end of said fluid transfer duct is attached to the bottom of the reservoir, adjacent the base of the container, whilst the point of entry of the upper end of said fluid transfer duct into said measuring and dispensing chamber is adjacent the top of said chamber, and adjacent the point at which said nozzle is attached to said chamber. Hence, the measuring and dispensing chamber is effectively offset to one side relative to the dispensing nozzle, with said nozzle being located at one end of said chamber, and this design allows for efficient measurement and dispensing of the fuel additive.

Thus, in operation, the reservoir is squeezed in order to force the additive up the fluid transfer duct and into the measuring and dispensing chamber until the desired level is reached. The end of the nozzle is then presented to the entry orifice of a fuel tank with the container oriented such that the fluid transfer duct is located uppermost. In said orientation, the larger portion of the measuring and dispensing chamber is located below the point at which the dispensing nozzle exits said chamber, so the fuel additive is held in this portion of the chamber and is prevented from leaving the container. After insertion of said nozzle into the entry orifice of the fuel tank, the container is then rotated through 180°, causing the major portion of the measuring and dispensing chamber to be located above the dispensing nozzle, thereby allowing said fluid to be dispensed through said nozzle and into the fuel tank.

Adjustment of the size of the mouth of the dispensing nozzle is most conveniently achieved by means of an outer sleeve of greater internal diameter than the inner tube, which is moveably attached to the outside of the tube and may be moved from a first position, distant from the mouth of the nozzle, to a second position, proximate the mouth of the nozzle. When the sleeve is located in said first position, the effective internal and external diameters of the mouth of the nozzle are equal to the internal and external diameters, respectively, of the inner tube of the nozzle whilst, with the sleeve in said second position, the effective internal and external diameters of the mouth of the nozzle are equal to the internal and external diameters, respectively, of the outer sleeve.

Preferably, said sleeve may be moved slidably and/or rotatably from said first position to said second position. Preferably, said sleeve comprises a cylindrical sleeve which is moveably attached to the outside of the dispensing tube, optionally by engaging means. In one embodiment, wherein said sleeve is slidably attached to said tube, said engaging means preferably comprises one or more longitudinal protruding ribs formed on the inner surface of said sleeve, said ribs being adapted to cooperate with one or more longitudinal grooves formed on the outer surface of the tube. Alternatively, the inner surface of said outer sleeve may be provided with barbed protuberances which engage with and grip the outer surface of said inner tube. In a further alternative embodiment, no engaging means may be present, and said sleeve may simply fit closely around the outside of the tube.

In different embodiments, wherein said sleeve is rotatably attached to said tube, engaging means may comprise one or more spiral protruding ribs formed on the inner surface of said sleeve, said ribs being adapted to cooperate with one or more spiral grooves formed on the outer surface of the tube. Alternatively, the inner surface of said outer sleeve may be provided with barbed protuberances which engage with and grip the outer surface of said inner tube. In a further alternative embodiment, no engaging means may be present, and said sleeve may simply fit closely around the outside of the tube.

In still further, and more preferred embodiments, wherein said sleeve is slidably and rotatably attached to said tube, the inner surface of said outer sleeve is preferably provided with barbed protuberances which engage with and grip the outer surface of said inner tube. In an alternative embodiment, no engaging means may be present, and said sleeve may simply fit closely around the outside of the tube.

In certain embodiments wherein said sleeve is rotatably attached to said inner tube, said sleeve may be in the form of a truncated cylinder, with the tube also having a corresponding truncated cylindrical shape, the truncated end of the cylinder in each case being located at the end of the nozzle distant from the mouth, where the nozzle joins the container. Thus, the angle at which the nozzle joins the container is not a right angle. When the sleeve is located in said first position, the truncated end of said sleeve is aligned with the truncated end of said nozzle whereas, when the sleeve is rotatably moved to said second position, said sleeve partially abuts a surface of the container and due to the angle of said surface, rotation through approximately 180° causes said sleeve to be moved along the direction of the nozzle until it reaches said second position.

In more preferred embodiments, however, said sleeve is slidably and rotatably attached to said inner tube, and said sleeve comprises a cylinder having at its base two extended lugs, located at 180° to each other at either side of said base. Correspondingly, the neck of said container, at the point where the nozzle joins the container, comprises two recesses, located at 180° to each other at opposite sides of the nozzle and adapted to receive said lugs. Thus, when said lugs are positioned in said recesses, the sleeve is located in said first position. However, said sleeve may be slidably moved upwards, in the direction of the mouth of said inner tube, and then rotated through approximately 90° wherein said lugs are moved upwards out of said recesses, said sleeve is moved along the direction of the nozzle, and the bottom surfaces of said lugs rest against the upper surface of the body of the container, thus locating said sleeve in said second position.

Generally, said sleeve can only be moved from said first position when the cap is removed from the end of the nozzle. Optionally, when said sleeve has been moved to said second position, it may be fixedly held in said second position by locking means. Typically, said locking means may comprise one or more protuberances formed on the inner surface of said sleeve and adapted to engage with one or more recesses or other surface features formed on the outer surface of said tube, and/or may rely on the abutment of the lower end of the sleeve against one or more surfaces of the container.

In the most preferred embodiment of the invention, wherein said dispensing container is used for the dispensing of fuel additives, the mouth of the inner tube of the nozzle has an external diameter which facilitates engagement with the entry orifice of a fuel tank associated with a petrol engine. However, any attempt to engage the nozzle in this configuration with the entry orifice of a fuel tank associated with a diesel engine would be unsuccessful due to the presence of barrier mechanisms which are adapted to be opened only by the insertion of a tube of the correct diameter. Thus, when the dispensing container is in the arrangement wherein the sleeve is in its first position, distant from the mouth of the nozzle, then the container is adapted for use with petrol-driven vehicles, but is prevented from being used with diesel-powered vehicles.

Additionally, in said most preferred embodiment of the invention, the external diameter of the outer sleeve is such that this is adapted to engage with the entry orifice of a fuel tank associated with a diesel engine. Thus, when the arrangement of the dispensing container is such that the sleeve is in its second position, proximate the mouth of the nozzle, then the container is adapted for use with diesel-powered vehicles, but is prevented from use with petrol-driven vehicles, since the effective diameter of the nozzle is greater than the diameter of the entry orifice of a fuel tank associated with a petrol engine.

In this way, it is possible to provide a single dispensing container which is adapted for use in conjunction with the fuel tanks of both petrol and diesel engines, and which may be employed as a container for a fuel additive for either petrol or diesel fuel. Thus, a single design of dispensing container, having a single nozzle of adjustable diameter, is provided for use in either scenario, thereby precluding the necessity for the production of containers of different designs for the different uses, and avoiding all the attendant tooling and manufacturing difficulties and providing a significant saving in terms of resources.

In said most preferred embodiments, it is required that the external diameter of the mouth of said nozzle should be tightly controlled within the range of 19.8-20.2 mm when the dispensing container is to be used with petrol, and that said external diameter should be tightly controlled within the range of 24.7-25.3 mm when the dispensing container is to be used with diesel fuel. Thus, said inner tube has an external diameter of 20.0±0.2 mm, whilst the external diameter of said outer sleeve falls in the range of 25.0±0.3 mm.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

BRIEF DESCRIPTION OF THE DRAWINGS

The invention will now be further illustrated, though without in any way limiting the scope thereof, by reference to the accompanying drawings, wherein.

DETAILED DESCRIPTION OF THE INVENTION

Figure 1:
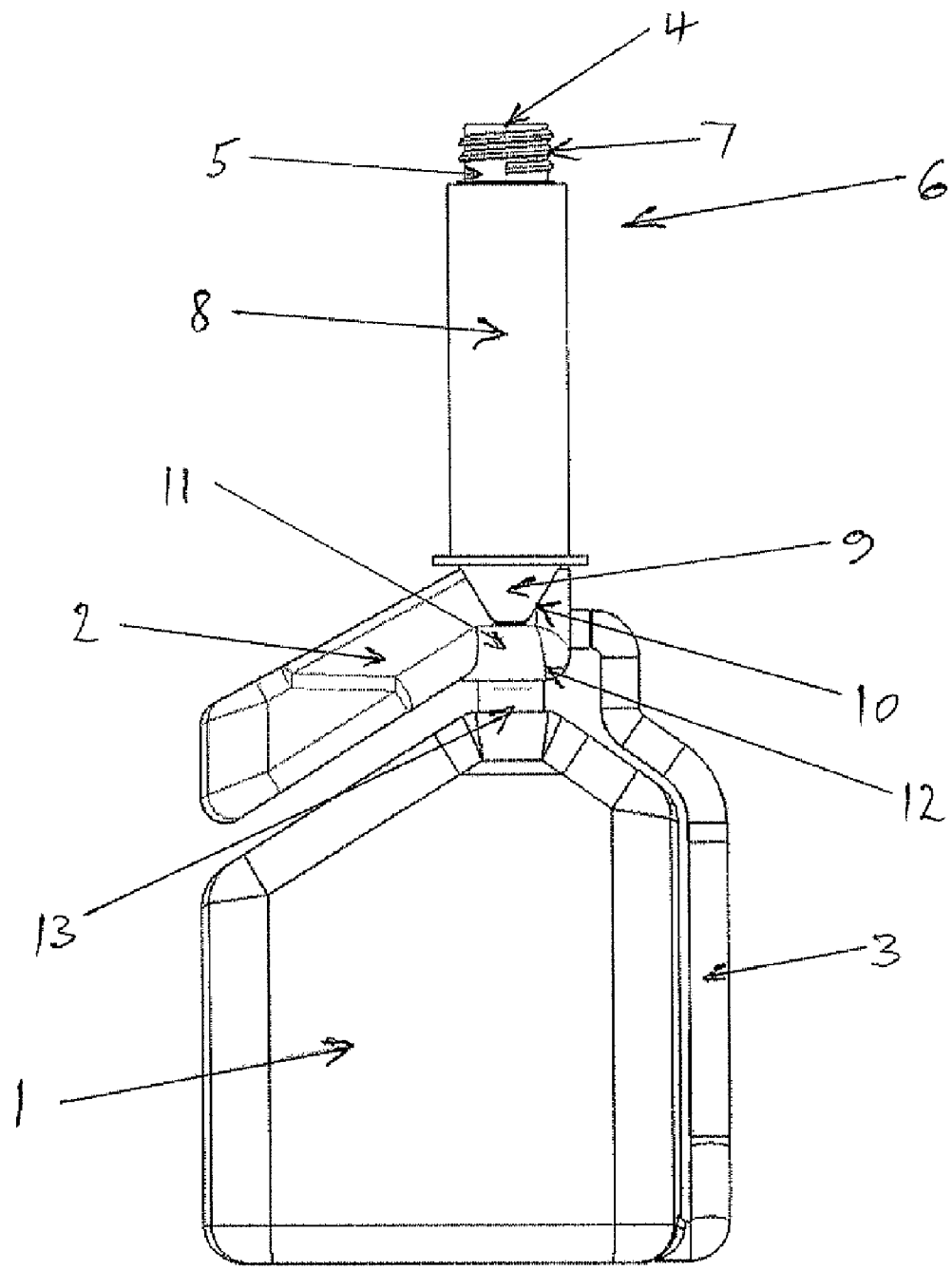
FIG. 1 shows a front elevation of an embodiment of the invention comprising a dispensing container for fuel additives, wherein the sleeve is in the first (recessed) position relative to the inner tube.
Figure 2:
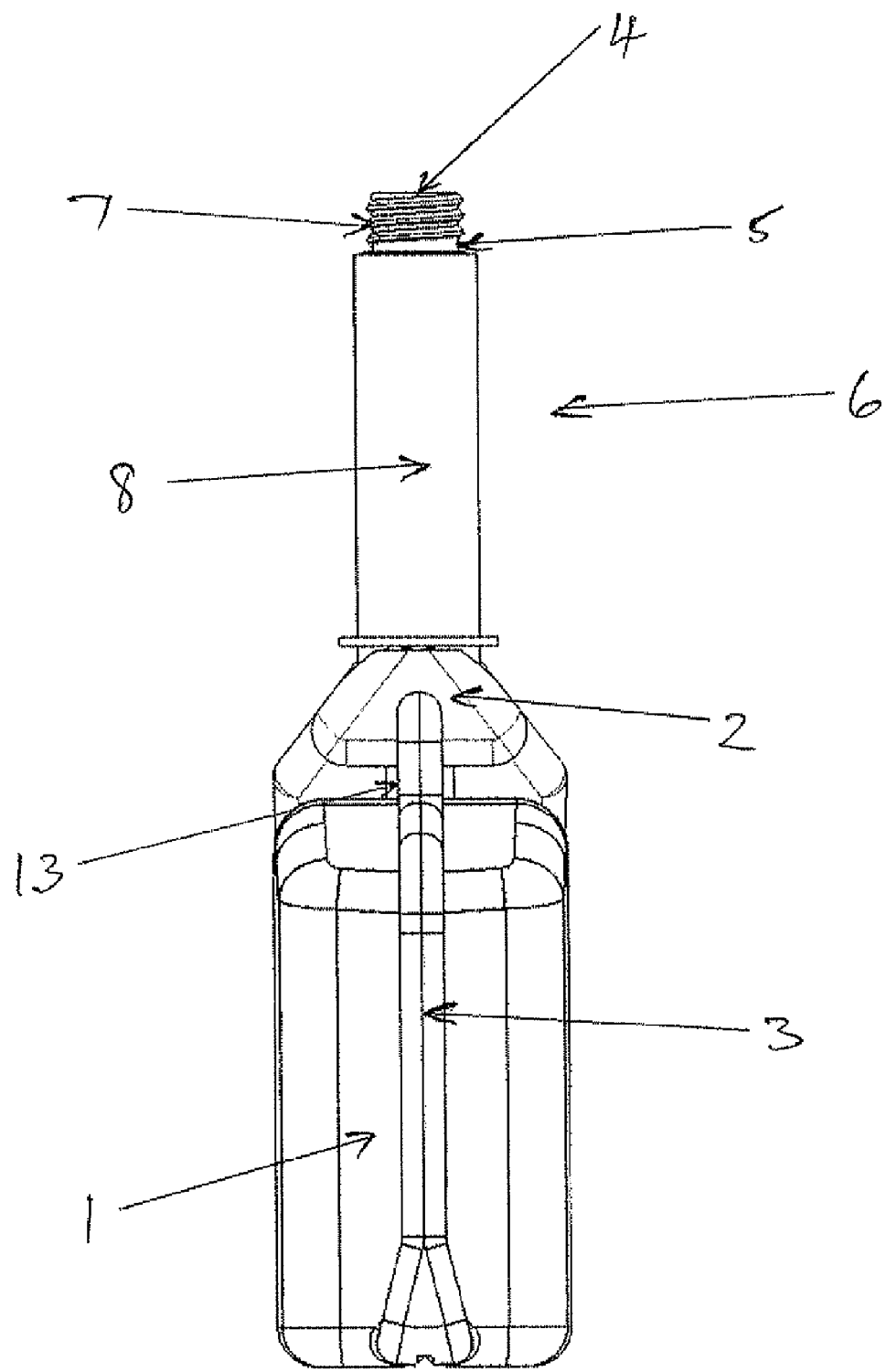
FIG. 2 shows a side elevation of an embodiment of the invention comprising a dispensing container for fuel additives, wherein the sleeve is in the second (extended) position relative to the inner tube.

Referring firstly to FIGS. 1 and 2, there is shown a dispensing container for fuel additives which comprises a reservoir (1), a measuring chamber (2), a transfer duct (3) for liquid to flow between the reservoir and chamber when the container is suitably tilted and a mouth (4) located at the end of the inner tube (5) of the dispensing nozzle (6), at the end of which tube is screw thread (7). Outer sleeve (8) is located around the outer surface of the tube (5) and comprises lugs (9) which abut chamber (2) in recesses (10). A plug (11) is inserted so as to close the throat (12) of a neck (13) between the reservoir (1) and chamber (2). The plug (1) may be removable, but is preferably a permanent closure so as to reduce the likelihood of the container being reused for a different additive when the container is contaminated with the original additive.

Figure 3:
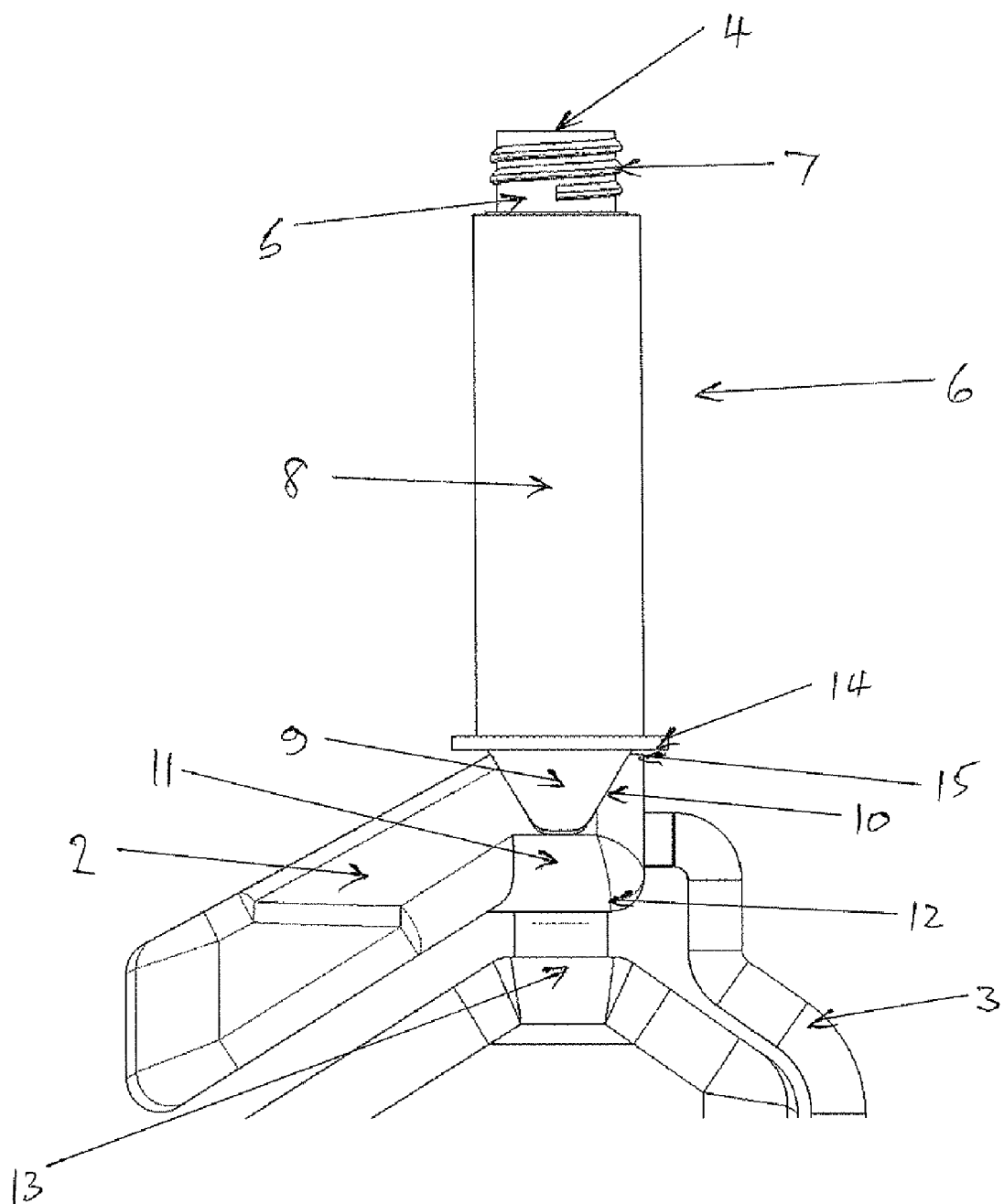
FIG. 3 shows a front elevation of the top section of a container according to an embodiment of the invention comprising a sleeve in the first (recessed) position relative to the inner tube.

Turning to FIG. 3, there is depicted the top section of measuring chamber (2), to which is attached nozzle (6), which comprises inner tube (5) having mouth (4) and screw thread (7). Surrounding the inner tube (5) is outer sleeve (8) which comprises lugs (9) seated in recesses (10) of chamber (2) and protuberances (14) which abut the upper surface (15) of chamber (2). In said first (recessed) position, the upper section of inner tube (5) extends above the outer sleeve (8).

Figure 4:
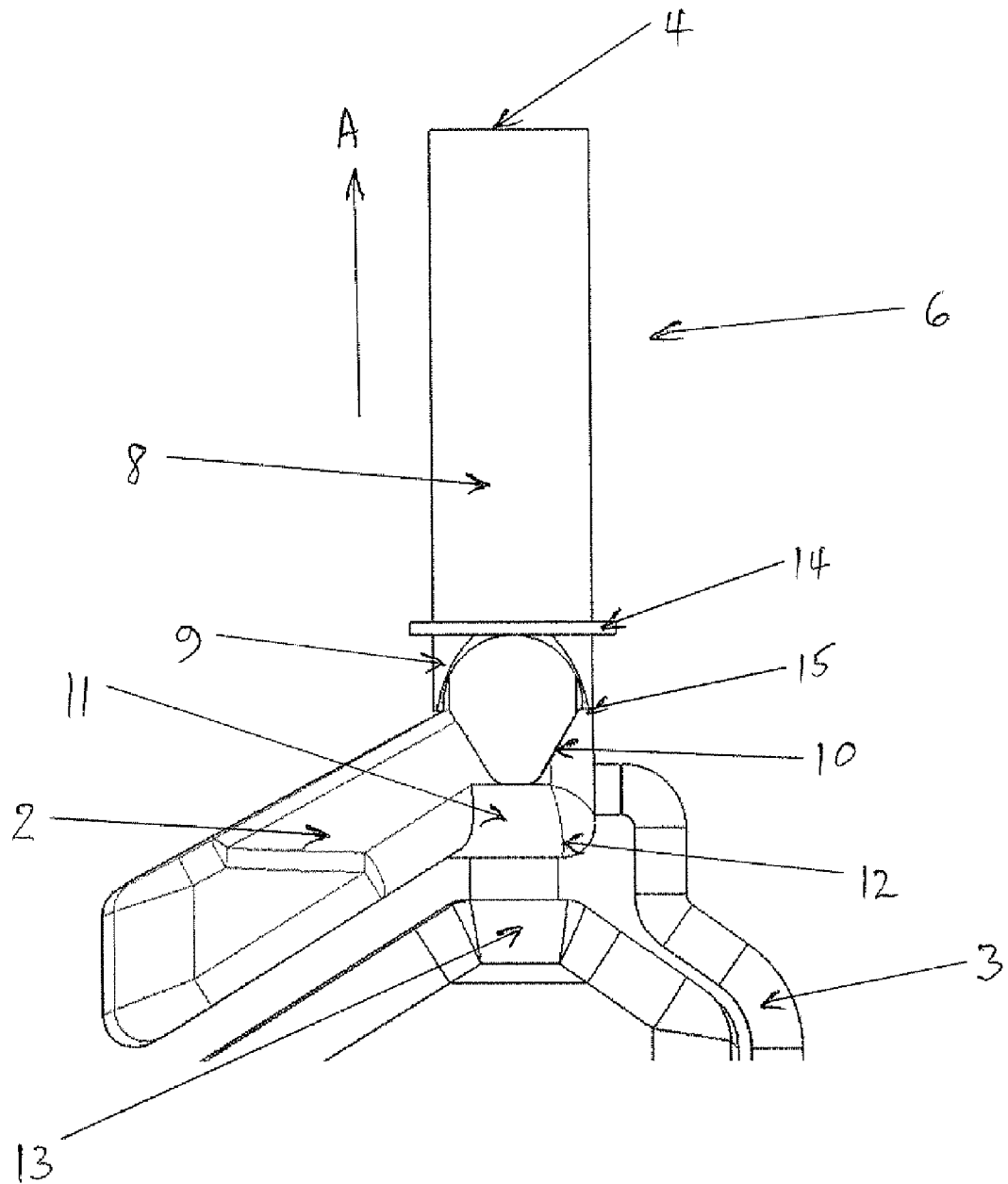
FIG. 4 shows a front elevation of the top section of a container according to an embodiment of the invention comprising a sleeve in the second (extended) position relative to the inner tube.

As can be seen from FIG. 4, the sleeve (8) may be slidably moved in the direction A and rotated through approximately 90°, whereby the lugs (9) then abut the upper surface (15) of the chamber (2), such that the sleeve is then held in the second (extended) position and the top of the outer sleeve (8) is approximately at the same level as the mouth (4) of the inner tube (not shown).

The dispensing container of the invention is relatively cheap and easy to manufacture and may be used for the dispensing of fuel additives for either petrol or diesel fuel.

Thus, the difficulties and inconvenience associated with the previous requirement for the manufacture of different containers for the different additives may conveniently be avoided, resulting in significant savings in time and expenditure. Most conveniently, the sleeve is removed from the container when it is to be used for the dispensing of petrol additives, and the sleeve is only placed on the container when it is intended for use in conjunction with additives for diesel fuel.

In operation, the container is squeezed so as to fill the chamber (2) with liquid fuel additive from reservoir (1), with the cap being removed from the mouth (4) as necessary to permit this to occur. The chamber (2) is filled to the level required, and the container is then presented to the entry orifice of a fuel tank with the transfer duct (3) uppermost, causing the additive to be held in the part of the chamber (2) below the tube (5). Once inserted in the entry orifice of the fuel tank, said container is rotated through 180°, causing the part of the chamber (2) holding the liquid to be moved to a position above the tube (5), which thereby allows the liquid in the chamber (2) to be dispensed along the tube (5) and out through the mouth (4) into the fuel tank.

Typically, the chamber (2) is filled to its maximum capacity, indicated by a mark on its outer surface. However, quantities less than the maximum capacity of the chamber (2) may be dispensed by squeezing lesser volumes into the chamber and, for this purpose, the wall of the chamber (2) may incorporate a graduated scale to indicate the levels for partial doses.

That which is claimed is:

1. A dispensing container for liquids comprising a reservoir which is connected to a dispensing nozzle, said nozzle having a mouth through which liquid is dispensed, wherein said mouth comprises an orifice of circular cross-section, and said nozzle is adjustable to provide orifices of different diameters, wherein said container additionally comprises a measuring and dispensing chamber which communicates with said reservoir by means of a fluid transfer duct, wherein the lower end of said fluid transfer duct is attached to the bottom of said reservoir and adjacent to the base of said container, and a point of entry of the upper end of said fluid transfer duct into said measuring and dispensing chamber is adjacent to the top of said chamber and adjacent to a point at which said nozzle is attached to said chamber.

2. The container as claimed in claim 1 which comprises a dispenser for fuel additives, wherein said liquid comprises a fuel additive and wherein said fuel additive is an additive for petrol or an additive for diesel.

3. The container as claimed in claim 1 which is formed from a plastics material.

4. The container as claimed in claim 3 wherein said plastics material is manufactured by blowmoulding and comprises high density polyethylene.

5. The container as claimed in claim 1 wherein the reservoir has a throat in alignment with the mouth at the end of the nozzle, wherein a plug is inserted into the throat in order to control fluid communication between the reservoir and the measuring chamber.

6. The container as claimed in claim 5 wherein said plug is a stopper, or said plug is a valve which prevents or permits passage of fluid through the throat between the reservoir and the measuring chamber.

7. The container as claimed in claim 1, wherein the upper end of the fluid transfer duct and point of entry into the measuring and dispensing chamber are positioned on the same plane thereby providing flow of fluids from the upper end of the fluid transfer duct into the measuring and dispensing chamber to be on the same plane.

8. The container as claimed in claim 1 wherein said adjustable nozzle comprises an inner tube fixedly connected to the reservoir and an outer sleeve of greater internal diameter than the inner tube wherein said outer sleeve is moveably attached to the exterior of said tube such that it can be moved from a first position distant from the mouth of the nozzle to a second position proximate said mouth in order that an effective diameter of the orifice is equal to the internal diameter of said sleeve.

9. The container as claimed in claim 8 wherein said sleeve is slidably and/or rotatably moved from said first position to said second position.

10. The container as claimed in claim 8 wherein the end of the inner tube incorporates closure means and wherein said closure means comprises a screw thread on the external surface of the inner tube which can engage with a suitable cap.

11. The container as claimed in claim 8 wherein said sleeve comprises a cylindrical sleeve which is moveably attached to the outside of the inner tube.

12. The container as claimed in claim 11 wherein said sleeve is moveably attached to the outside of said inner tube by engaging means and said engaging means comprises:
(a) one or more longitudinal protruding ribs formed on the inner surface of said sleeve, wherein said ribs are adapted to cooperate with one or more longitudinal grooves formed on the outer surface of said inner tube; or
(b) barbed protuberances which engage with and grip the outer surface of said inner tube.

13. The container as claimed in claim 11 wherein said sleeve is rotatably attached to the outside of said nozzle by engaging means and said engaging means comprises:
(a) one or more spiral protruding ribs formed on the inner surface of said sleeve, wherein said ribs are adapted to cooperate with one or more spiral grooves formed on the outer surface of said inner tube; or
(b) barbed protuberances which engage with and grip the outer surface of said inner tube.

14. The container as claimed in claim 11 wherein said sleeve is slidably or rotatably attached to the outside of said inner tube, no engaging means are present and said sleeve fits closely around the outside of said tube.

15. The container as claimed in claim 11 wherein said sleeve is slidably and rotatably attached to said inner tube and comprises a cylinder having at its base two extended lugs, located at 180° to each other at either side of said base, and the neck of said container, at the point where said nozzle joins said container, comprises two recesses, located at 180° to each other at opposite sides of the nozzle and adapted to receive said lugs.

16. The container as claimed in claim 11 wherein said sleeve is rotatably attached to said inner tube, said sleeve is in the form of a truncated cylinder, and said tube has a corresponding truncated cylindrical shape, wherein the truncated end of the cylinder is located at the end of the nozzle distant from the mouth, where the inner tube joins the container.

17. The container as claimed in claim 8 wherein said sleeve is fixedly held in said second position by a locking means, wherein said locking means comprises one or more protuberances formed on the inner surface of said sleeve and adapted to engage with one or more recesses or other surface features formed on the outer surface of said inner tube.

18. The container as claimed in claim 17 wherein said locking means comprises one or more protuberances formed on the inner surface of said sleeve and adapted to engage with one or more recesses or other surface features formed on the outer surface of said inner tube.

19. The container as claimed in claim 8 wherein said dispensing container is used for the dispensing of fuel additives and the mouth of the inner tube has an external diameter which facilitates engagement with the entry orifice of a fuel tank associated with a petrol engine.

20. The container as claimed in claim 8 wherein the external diameter of the outer sleeve is such that said sleeve is adapted to engage with the entry orifice of a fuel tank associated with a diesel engine.

* * * * *